(12) United States Patent
Kim et al.

(10) Patent No.: US 8,658,902 B2
(45) Date of Patent: Feb. 25, 2014

(54) ELECTRICAL TRANSMISSION LINE

(75) Inventors: Jeong-Ik Kim, Seoul (KR); Sang-Gyum Kim, Anyang-si (KR); Il-Jo Kwak, Seoul (KR); Heung-Nam Han, Seoul (KR)

(73) Assignee: LS Cable Ltd., Anyang-si, Gyeonggi-do (KR)

( * ) Notice: Subject to any disclaimer, the term of this patent is extended or adjusted under 35 U.S.C. 154(b) by 401 days.

(21) Appl. No.: 13/049,103

(22) Filed: Mar. 16, 2011

(65) Prior Publication Data

US 2011/0226509 A1   Sep. 22, 2011

(30) Foreign Application Priority Data

Mar. 16, 2010   (KR) .......................... 10-2010-0023315
Mar. 22, 2010   (KR) .......................... 10-2010-0025327

(51) Int. Cl.
    *H01B 5/00*   (2006.01)

(52) U.S. Cl.
    USPC ...................... 174/126.1; 174/126.2

(58) Field of Classification Search
    USPC .............. 174/28, 102 R, 108, 106 R, 102 SC, 174/106 SC
    See application file for complete search history.

(56) References Cited

U.S. PATENT DOCUMENTS

| | | | |
|---|---|---|---|
| 2004/0020681 A1* | 2/2004 | Hjortstam et al. ...... | 174/102 SC |
| 2007/0293086 A1* | 12/2007 | Liu et al. ........................ | 439/578 |
| 2008/0251270 A1* | 10/2008 | Lee et al. .................. | 174/105 R |
| 2008/0251274 A1* | 10/2008 | Lee et al. .................. | 174/113 R |
| 2008/0254675 A1* | 10/2008 | Lee et al. ...................... | 439/578 |

* cited by examiner

*Primary Examiner* — William H Mayo, III
(74) *Attorney, Agent, or Firm* — Sherr & Jiang, PLLC

(57) ABSTRACT

An electrical transmission line for transmitting electricity is made of a composite material in which aluminum and a plurality of carbon nanotubes are combined, and a weight ratio of the carbon nanotubes to the aluminum is 0.5 to 3 wt %. The carbon nanotubes are oriented at an angle within 30° along a length direction of the electrical transmission line.

6 Claims, 3 Drawing Sheets

ELECTRICAL TRANSMISSION LINE

CROSS-REFERENCE TO RELATED APPLICATION

This application claims priority under 35 USC 119(a) to Korean Patent Application No. 10-2010-0023315 filed in Republic of Korea on Mar. 16, 2010 and Korean Patent Application No. 10-2010-0025327 filed in Republic of Korea on Mar. 22, 2010, the entire contents of which are incorporated herein by reference.

BACKGROUND OF THE INVENTION

1. Field of the Invention

The present invention relates to an electrical transmission line, and more particularly to an electrical transmission line with improved mechanical strength.

2. Description of the Related Art

Generally, an electrical transmission line is used for transmitting electricity to a destination and is made of conductive metal such as copper and aluminum. There are various kinds of electrical transmission lines, among which an electrical transmission line installed on the ground and extending to a long distance should have high mechanical strength.

Overhead transmission lines and electrical transmission lines for electric trains are such electrical transmission lines demanding high mechanical strength.

The electrical transmission line for electric trains provides electricity to an electric train through a pantagraph provided at the upper portion of the electric train. This electrical transmission line for electric trains should have high conductivity since it supplies electricity to a moving electric train. Also, the electrical transmission line for electric trains should have high tensile strength and high abrasion resistance since it extends several ten kilometers or several hundred kilometers and suffers from the friction against the pantagraph.

Most electrical transmission lines for electric trains available in the market are made of copper or aluminum material. However, an electrical transmission line made of copper or aluminum has low tensile strength and low abrasion resistance in spite of high conductivity, which causes a lot of maintenance costs. In other words, the electrical transmission line for electric trains made of copper or aluminum is easily worn out due to the friction against the pantagraph or easily bends or warps due to the low tensile strength, which results in frequent exchange or repair. In particular, since copper is expensive, in a case where an electrical transmission line for electric trains is made of copper, a production cost of the electrical transmission line for electric trains is increased.

Meanwhile, an overhead transmission line is an electrical transmission line for transmitting the electricity produced at a power generator to a far-off destination or primary substation, and the overhead transmission line is supported by pylons on the ground. This overhead transmission line includes a plurality of conductor units that take a charge of the transmission of electricity and support the transmission line. The conductor units are generally made of pure aluminum or aluminum alloy and are coupled and fixed to an external supporting structure such as a pylon to keep the strength of the overhead transmission line. Also, the conductor units play a role of transmitting the electricity generated at a power generator to a destination. However, the conductor units may be not suitably coupled to a pylon due to their weak mechanical strength.

In order to solve this problem, there has been proposed an ACSR (Aluminum Cable Steel Reinforced) overhead transmission line in which a central tension wire with strong mechanical strength is provided at the center of conductor units. The conductor units provided to the ACSR take a charge of the transmission of electricity and extends on the outer periphery of the central tension wire in a twisted pattern. Also, the central tension wire located at the center portion of the overhead transmission line generally adopts a steel core or a steel wire with strong mechanical strength to play a role of keeping the strength of the electrical transmission line while supporting the electrical transmission line.

However, the central tension wire occupies 30% or more of the entire weight and greatly deteriorates the electrical transmission capacity. In other words, the central tension wire formed with a steel core or a steel wire increases the weight of the entire overhead transmission line and also increases the sectional area of the overhead transmission line, thereby deteriorating the electrical transmission capacity of the entire overhead transmission line.

SUMMARY OF THE INVENTION

The present invention is designed to solve the problems of the prior art, and therefore it is an object of the present invention to provide an electrical transmission line having reinforced mechanical strength while keeping electric conductivity to a predetermined level.

Other objects and advantages of the present invention may be understood from the following description and will become apparent from the embodiments of the present invention. In addition, it would be obvious that objects and advantages of the present invention can be realized by the means defined in the appended claims or their combinations.

In one aspect of the present invention, there is provided an electrical transmission line for transmitting electricity, wherein the electrical transmission line is made of a composite material in which aluminum and a plurality of carbon nanotubes are combined, and a weight ratio of the carbon nanotubes to the aluminum is 0.5 to 3 wt %.

Preferably, the carbon nanotubes in the electrical transmission line are oriented at an angle within 30° along a length direction of the electrical transmission line.

More preferably, 80% or more of the plurality of carbon nanotubes are oriented at an angle within 30° along a length direction of the electrical transmission line.

In another aspect of the present invention, there is also provided an electrical transmission line in which a plurality of conductor units playing both roles of transmitting electricity and supporting a wire extend in a twisted pattern, wherein the conductor units are made of a composite material in which aluminum and a plurality of carbon nanotubes are combined, and a weight ratio of the carbon nanotubes to the aluminum is 0.5 to 3 wt %.

In further aspect of the present invention, there is also provided an electrical transmission line, which includes a central tension wire and a plurality of conductor units extending on an outer periphery of the central tension wire in a twisted pattern, wherein at least one of the central tension wire and the conductor units is made of a composite material in which aluminum and a plurality of carbon nanotubes are combined, and a weight ratio of the carbon nanotubes to the aluminum is 0.5 to 3 wt %.

The present invention may elongate a life span of an electrical transmission line and reduce maintenance costs for the electrical transmission line by improving mechanical strength of the electrical transmission line.

In particular, the electrical transmission line for electric trains according to the present invention keeps electric conductivity over 50% IACS (International Annealed Copper Standard), which ensures satisfactory transmission of electricity to an electric train.

In addition, the overhead transmission line according to the present invention includes conductor units or a central tension wire made of aluminum-carbon nanotube composite material, which increases a supporting force against a pylon and increases an entire electrical transmission capacity in comparison to conventional ASCR overhead transmission lines.

Further, the overhead transmission line according to the present invention is more lightweight than conventional ASCR overhead transmission lines since the central tension wire is made of aluminum-carbon nanotube composite material that is more lightweight than steel cores or steel wires.

BRIEF DESCRIPTION OF THE DRAWINGS

The following drawings attached to this specification illustrate preferred embodiments of the present invention, for the purpose of better understanding of the technical spirit of the present invention along with detailed contents for implementing the present invention, and thus the present invention should not be interpreted as being limited only to the drawings.

DESCRIPTION OF THE PREFERRED EMBODIMENT

The above objects, features, and advantages of the present invention will become apparent from the following description of embodiments with reference to the accompanying drawing, and accordingly the technical spirit of the present invention can be easily implemented by those having ordinary skill in the art. In addition, in a case where detailed description about known technologies related to the present invention may unnecessary obscure the essentials of the present invention, the detailed description about known technologies may be omitted. Hereinafter, preferred embodiments of the present invention will be described in detail with reference to the accompanying drawings.

Prior to the description, carbon nanotube (CNT) applied to the present invention is described in brief.

In a carbon nanotube, a carbon atom is coupled to other three carbon atoms, and a graphite sheet having a hexagonal honeycomb-shaped pattern is rolled into a round shape with a nano-sized diameter to have a cylindrical structure (a tube structure) with a hollow therein. The carbon nanotube is known to have electric conductivity similar to that of copper, thermal conductivity equal to that of diamond, and strength stronger than that of steel.

Figure 1:
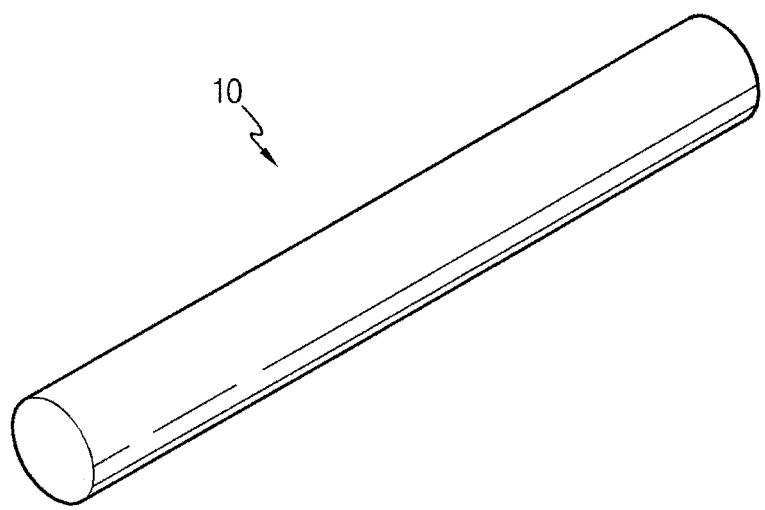
FIG. 1 shows an appearance of an electrical transmission line according to a first embodiment of the present invention.
Figure 2:
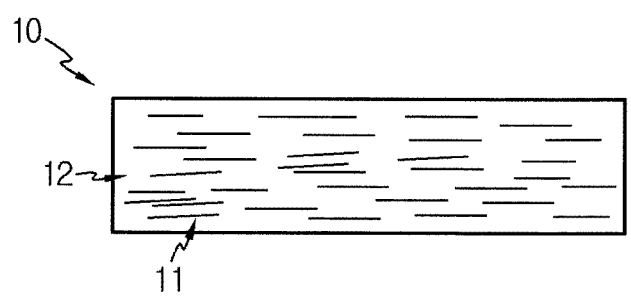
FIG. 2 is a sectional view showing the electrical transmission line according to the first embodiment of the present invention.

FIG. 1 shows an appearance of an electrical transmission line 10 according to a first embodiment of the present invention, and FIG. 2 is a sectional view showing the electrical transmission line 10 according to the first embodiment of the present invention.

Referring to FIGS. 1 and 2, the electrical transmission line 10 according to the present invention is made of a composite material in which aluminum 12 and a plurality of carbon nanotubes 11 are combined (hereinafter, referred to as an 'aluminum-carbon nanotube composite material'), in order to improve abrasion resistance and tensile strength. In other words, the electrical transmission line 10 is made of aluminum 12 and a plurality of carbon nanotubes 11 dispersed in the aluminum 12. Also, an insulator (not shown) surrounding the outer periphery of the electrical transmission line 10 and a sheath (not shown) surrounding the insulator may be further added as components of the electrical transmission line 10.

The electrical transmission line 10 has various electric conductivities and various mechanical strengths depending on a weight ratio of the carbon nanotubes 11 to the aluminum 12.

The following table 1 shows experimental data of abrasion resistance, electric conductivity, and tensile strength, measured for test pieces produced according to the first embodiment of the present invention and test pieces respectively made of pure aluminum and pure copper.

TABLE 1

|  | Pure copper | Pure aluminum | CNT 0.2 wt % | CNT 0.5 wt % | CNT 1 wt % | CNT 3 wt % | CNT 8 wt % |
|---|---|---|---|---|---|---|---|
| Abrasion depth (μm) | 2.9 | 30.0 | 25 | 2.7 | 2.3 | 2.2 | 2.5 |
| Electric conductivity (% IACS) | 97 | 60 | 57 | 56 | 55 | 47 | 40 |
| Tensile strength (kgf/mm$^2$) | 36 | 18 | 19 | 29 | 45 | 48 | 47 |

Seeing the table 1, it could be understood that the electrical transmission line 10 in which a weight ratio of the carbon nanotubes 11 to the aluminum 12 is 0.5 wt % to 3 wt % exhibits deteriorated electric conductivity but excellent abrasion resistance in comparison to a conventional electrical transmission line made of expensive pure copper, and the tensile strength is equivalent to or more excellent than that of the electrical transmission line made of pure copper. Also, it could be understood that the electrical transmission line 10 in which a weight ratio of the carbon nanotubes 11 to the aluminum 12 is 0.5 wt % to 3 wt % has greatly improved tensile strength and abrasion resistance in comparison to a conventional electrical transmission line made of pure aluminum, while electric conductivity is not greatly deteriorated.

However, if the weight ratio of the carbon nanotubes 11 to the aluminum 12 is smaller than 0.5 wt %, the electrical transmission line 10 has tensile strength of 19 kgf/mm$^2$ or less. Thus, the tensile strength is not greatly improved in comparison to a conventional electrical transmission line made of pure aluminum, and also the abrasion resistance is not greatly improved. In addition, if the weight ratio of the carbon nanotubes 11 to the aluminum 12 is greater than 3 wt %, the electric conductivity of the electrical transmission line 10 is greatly deteriorated below 40% IACS (International Annealed Copper Standard), and also the tensile strength is rather decreased due to the rapid increase of fragility.

Thus, the weight ratio of the carbon nanotubes 11 to the aluminum 12 in the electrical transmission line 10 is preferably 0.5 wt % to 3 wt %.

Meanwhile, the carbon nanotubes 11 formed in the electrical transmission line 10 are preferably oriented within an angle of 30° along a length direction of the electrical transmission line 10 in consideration of mechanical strength and conductivity of the electrical transmission line 10. If the carbon nanotubes 11 are oriented over an angle of 30° along the length direction of the electrical transmission line 10, the interfaces between the aluminum matrix and the carbon nanotubes 11 interfere the progress of electric current, which may cause loss of electric conductivity by 20% or more, and thus the carbon nanotubes 11 are preferably oriented within an angle of 30° along the length direction of the electrical transmission line 10.

More preferably, 80% or more of the plurality of carbon nanotubes 11 are oriented within an angle of 30° along the length direction of the electrical transmission line 10.

The following table 2 shows experimental data of electric conductivity and tensile strength, measured for a plurality of electrical transmission lines 10 produced to have various orientation ratios of carbon nanotubes which are within 30° along the length direction of the electrical transmission line 10. In order to measure the data of the table 2, each electrical transmission line 10 is cut so that its cross section may be observed with a TEM (Transmission Electron Microscope), and then the number of carbon nanotubes 11 formed within 30° along the length direction of the electrical transmission line 10 is counted so that the orientation ratio of the carbon nanotubes is converted into a percentage.

Further, in the electrical transmission lines 10 used in the experiment of the table 2, the weight ratio of the carbon nanotubes 11 to the aluminum 12 is maintained equally. In other words, the electrical transmission lines 10 used in the experiment of the table 2 have the same weight ratio so that the weight ratio of the carbon nanotubes 11 to the aluminum 12 becomes 1 wt %.

TABLE 2

| | CNT 1 wt % | | | | |
| --- | --- | --- | --- | --- | --- |
| | Sample 1 | Sample 2 | Sample 3 | Sample 4 | Sample 5 |
| CNT orientation rate within 30° | 19% or less | 20~39% | 40%~59% | 60%~79% | 80% or above |
| Electric conductivity (% IACS) | 52 | 52 | 54 | 55 | 56 |
| Tensile strength (kgf/mm$^2$) | 30 | 35 | 39 | 40 | 45 |

Seeing the table 2, as the orientation ratio of the carbon nanotubes 11 within 30° along the length direction of the electrical transmission line 10 is lower, the electric conductivity and tensile strength of the electrical transmission line 10 are deteriorated. In addition, in a case where the orientation ratio of the carbon nanotubes 11 within 30° along the length direction of the electrical transmission line 10 is less than 80%, the interface between the aluminum matrix and the carbon nanotubes 11 is mismatched, and the mismatched interface acts as an initial crack generation point where an initial tensile stress is applied, which may deteriorate electric conductivity and tensile strength of the electrical transmission line 10. Thus, at least 80% of the plurality of carbon nanotubes 11 formed in the electrical transmission line 10 are preferably oriented within an angle of 30° along the length direction of the electrical transmission line 10.

The electrical transmission line 10 having improved mechanical strength as mentioned above may be used as an electrical transmission line for electric trains or an overhead transmission line.

Figure 3:
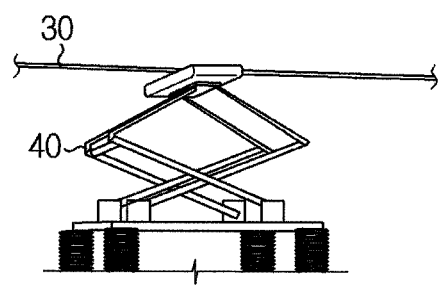
FIG. 3 shows an electrical transmission line for electric trains according to a second embodiment of the present invention.

FIG. 3 shows an electrical transmission line 30 for electric trains according to a second embodiment of the present invention.

Referring to FIG. 3, the electrical transmission line 30 for electric trains according to the second embodiment of the present invention contacts a pantagraph 40 provided at the upper portion of an electric train, and electricity is supplied to the electric train through the pantagraph 40. Also, though not shown in the figure, the electrical transmission line 30 for electric trains is supported by a plurality of messenger wires to hang in the air. This electrical transmission line 30 for electric trains should have strong abrasion resistance because of the friction against the pantagraph 40, and the electrical transmission line 30 should also have high tensile strength since the electrical transmission line 30 extends several kilometers or more.

Accordingly, the electrical transmission line 30 for electric trains according to the second embodiment of the present invention is made of aluminum-carbon nanotube composite material in order to improve abrasion resistance and tensile strength. In other words, the electrical transmission line 30 for electric trains is made of the aluminum 12 and the plurality of carbon nanotubes 11 dispersed in the aluminum 12, as shown in FIG. 2. In consideration of tensile strength, abrasion resistance, and electric conductivity of the electrical transmission line 30 for electric trains, a weight ratio of the carbon nanotubes 11 to the aluminum 12 is preferably 0.5 wt % to 3 wt % in the electrical transmission line 30 for electric trains. In addition, at least 80% of the plurality of carbon nanotubes 11 is preferably oriented within an angle of 30° along the length direction of the electrical transmission line 30 for electric trains.

Figure 4:
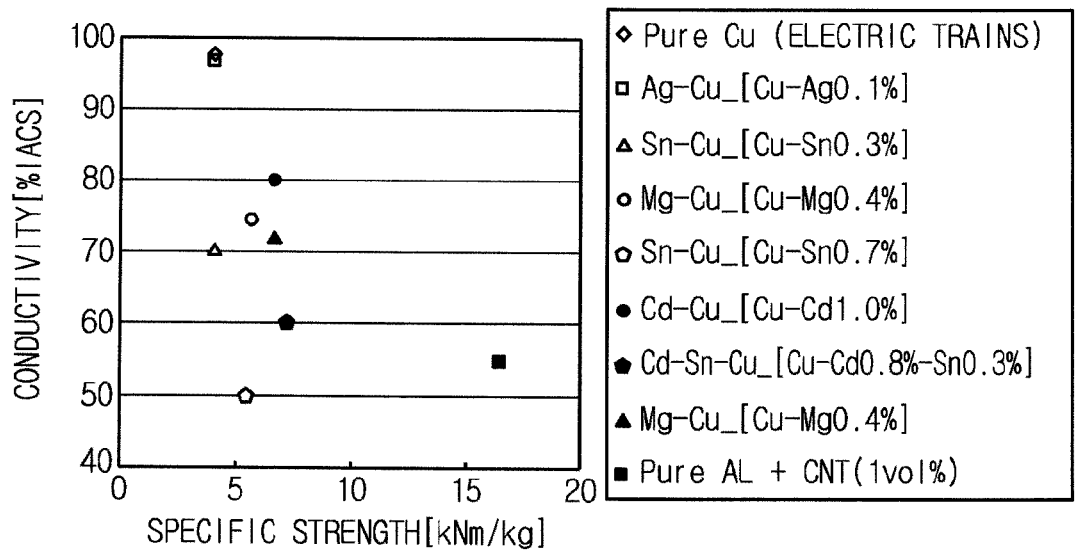
FIG. 4 is a graph comparatively showing properties of an electrical transmission line for electric trains, produced so that a weight ratio of carbon nanotube to aluminum is 1 wt %, and electrical transmission lines for electric trains, made of various copper alloy materials or pure copper.

FIG. 4 is a graph comparatively showing properties of the electrical transmission line 30 for electric trains, produced so that the weight ratio of the carbon nanotubes 11 to the aluminum 12 is 1 wt %, and electrical transmission lines for electric trains, which are made of various copper alloy materials or pure copper.

At least 80% of the plurality of carbon nanotubes 11 in the electrical transmission line 30 for electric trains shown in FIG. 4 are oriented within an angle of 30° along the length direction of the electrical transmission line 30 for electric trains.

Referring to FIG. 4, it could be understood that the electrical transmission line 30 for electric trains produced according to the second embodiment of the present invention has deteriorated conductivity in comparison to the electrical transmission lines for electric trains, which are made of pure copper or other copper alloy materials, but specific strength is greatly improved. In other words, the electrical transmission line 30 for electric trains in which the weight ratio of the carbon nanotubes 11 to the aluminum 12 is 1 wt % has conductivity generally deteriorated by 9% to 44% but specific strength greatly improved to a level of about 130% to 300%, in comparison to the electrical transmission lines for electric trains, which are made of other materials than tin-copper (Cu—Sn0.7%) alloy materials.

As described above, the electrical transmission line 30 for electric trains according to the second embodiment of the present invention shows slightly deteriorated conductivity and greatly improved mechanical strength in comparison to the conventional electrical transmission lines for electric trains. The electrical transmission line 30 for electric trains having the above properties is suitable for long-distance installation, ensures an elongated life cycle, and reduces maintenance costs.

Figure 5:
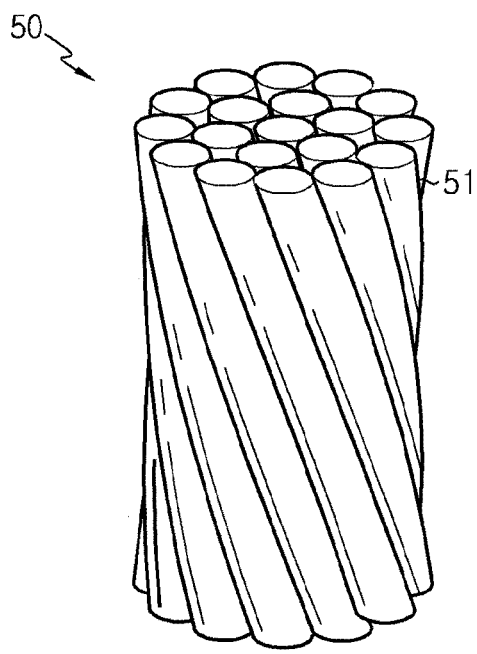
FIG. 5 shows an overhead transmission line according to a third embodiment of the present invention.

FIG. 5 shows an overhead transmission line 50 according to a third embodiment of the present invention.

Referring to FIG. 5, the overhead transmission line 50 according to the third embodiment of the present invention includes at least one conductor unit 51 used as an electricity transmitting means and a wire supporting means. Also, the overhead transmission line 50 may further include an insulator and a sheath.

The conductor unit 51 is coupled and fixed to a pylon constructed on the ground to play a role of supporting the entire overhead transmission line 50 and a role of transmitting electricity to a designation. In other words, the conductor unit 51 plays both roles of the wire supporting means and the electricity transmitting means.

In particular, the conductor unit 51 according to the third embodiment of the present invention is made of aluminum-carbon nanotube composite material to improve tensile strength. In other words, the conductor unit 51 is made of aluminum 12 and a plurality of carbon nanotubes 11 dispersed in the aluminum 12, as shown in FIG. 2. Preferably, the carbon nanotubes 11 formed in the conductor unit 51 are oriented within an angle of 30° along a length direction of the conductor unit 51. More preferably, at least 80% of the plurality of carbon nanotubes 11 is oriented within an angle of 30° along the length direction of the conductor unit 51. In addition, in consideration of tensile strength and electric conductivity, the weight ratio of the carbon nanotubes 11 to the aluminum 12 in the conductor unit 51 is 0.5 wt % to 3 wt %.

Figure 6:
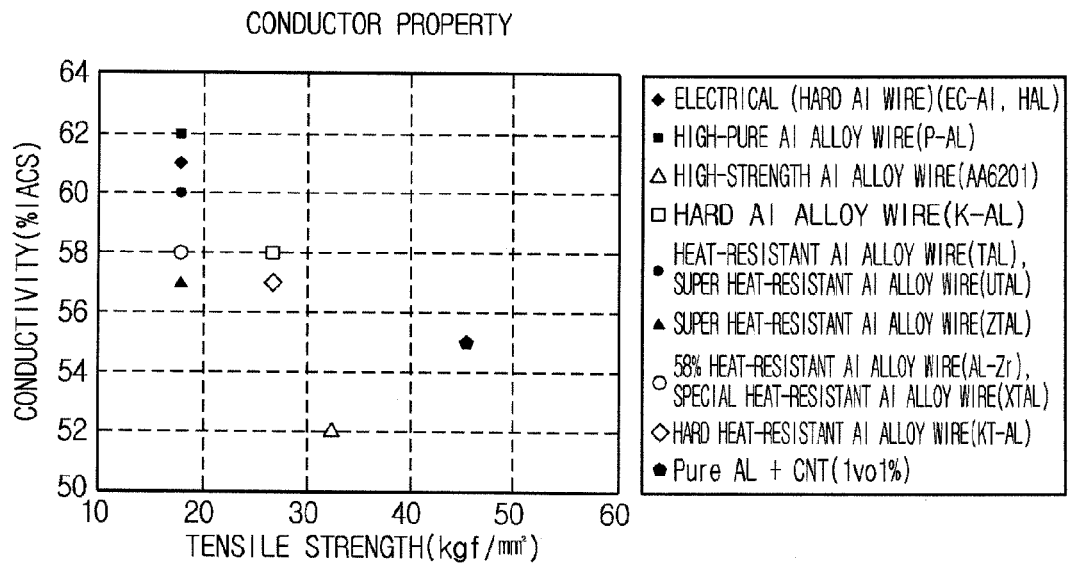
FIG. 6 is a graph comparatively showing properties of conductor units of an overhead transmission line, produced so that a weight ratio of carbon nanotube to aluminum is 1 wt %, and conductor units made of various aluminum alloy materials.

FIG. 6 is a graph comparatively showing properties of the conductor unit 51 of the overhead transmission line produced so that the weight ratio of the carbon nanotubes 11 to the aluminum 12 is 1 wt %, and conductor units made of various aluminum alloy materials.

At least 80% of the plurality of carbon nanotubes 11 in the conductor unit 51 shown in FIG. 6 is oriented within an angle of 30° along the length direction of the conductor unit 51.

Referring to FIG. 6, it could be understood that the conductor unit 51 of the overhead transmission line 50 produced according to the third embodiment of the present invention has deteriorated conductivity in comparison to other aluminum alloy materials, but tensile strength is greatly improved. In other words, it could be understood that the conductor unit 51 in which the weight ratio of the carbon nanotubes 11 to the aluminum 12 is 1 wt % has conductivity generally deteriorated by 3% to 12%, but the tensile strength is greatly improved by about 70% to 150%, in comparison to conductor units made of other materials than high-strength Al alloy wires. In addition, it could be understood from FIG. 6 that the conductor unit 51 in which the weight ratio of the carbon nanotubes 11 to the aluminum 12 is 1 wt % has conductivity improved by about 6% and tensile strength improved by 40%, in comparison to conventional high-strength Al alloy wires.

As described above, the overhead transmission line 50 according to the third embodiment of the present invention shows conductivity deteriorated by 3% to 12% and tensile strength greatly improved by about 70% to 150%, in comparison conventional overhead transmission lines. Accordingly, the overhead transmission line 50 according to the third embodiment of the present invention is suitable for long-distance installation and reduces initial installation costs for electricity infrastructure by demanding a less amount of pylons in an overhead transmission line installation region.

Meanwhile, the electrical transmission line 10 according to the present invention may be applied to an overhead transmission line having a central tension wire to improve mechanical strength and conductivity of the overhead transmission line.

Figure 7:
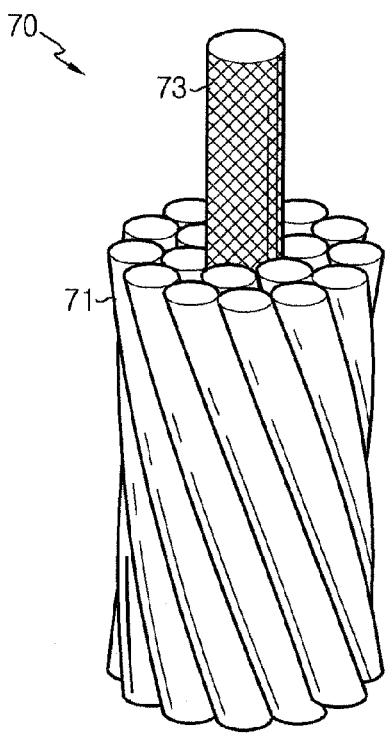
FIG. 7 shows an overhead transmission line according to a fourth embodiment of the present invention.

FIG. 7 shows an overhead transmission line 70 according to a fourth embodiment of the present invention.

As shown in FIG. 7, the overhead transmission line 70 according to the fourth embodiment of the present invention includes at least one conductor unit 71 and a central tension wire 73.

The central tension wire 73 is coupled and fixed to a pylon to play a role of supporting the entire overhead transmission line 70. The central tension wire 73 may be made of a steel core or a steel wire or be made of aluminum-carbon nanotube composite material. In a case where the central tension wire 73 is made of aluminum-carbon nanotube composite material, the central tension wire 73 plays a role of transmitting electricity in addition to the function of supporting the entire overhead transmission line 70. In this case, in consideration of the improvement of tensile strength and electric conductivity, the weight ratio of the carbon nanotubes 11 to the aluminum 12 in the central tension wire 73 is preferably 0.5 wt % to 3 wt %.

The conductor unit 71 is made of aluminum material and plays a role of transmitting electricity. The conductor unit 71 may be made of aluminum-carbon nanotube composite material, and in this case, the conductor unit 71 is coupled and fixed to a pylon or the like to support the entire overhead transmission line 70, in addition to the electricity transmitting function. Similarly, in a case where the conductor unit 71 is made of aluminum-carbon nanotube composite material, in consideration of tensile strength and electric conductivity, the weight ratio of the carbon nanotubes 11 to the aluminum 12 in the conductor unit 71 is preferably 0.5 wt % to 3 wt %.

The carbon nanotubes 11 formed in the conductor unit 71 or the central tension wire 73 are oriented within an angle of 30° along the length direction of the conductor unit 71 or the central tensile wire 73 as shown in FIG. 2 in consideration of mechanical strength and conductivity of the overhead transmission line 70. In detail, in a case where the carbon nanotubes 11 are oriented at an angle greater than 30° based on the length direction of the conductor unit 71 or the central tension wire 73, the interface between the aluminum matrix and the carbon nanotubes 11 interferes the progress of current, which may result in loss of electric conductivity by 20% or more. Thus, the carbon nanotubes 11 are preferably oriented within an angle of 30° along the length direction of the conductor unit 71 or the central tension wire 73.

Meanwhile, in a case where the orientation ratio of carbon nanotubes 11 formed within an angle of 30° along the length direction of the conductor unit 71 or the central tension wire 73 is less than 80%, the interface between the aluminum matrix and the carbon nanotubes 11 is mismatched, and the mismatched interface acts as an initial crack generation point where an initial tensile stress is applied, which may deteriorate electric conductivity and tensile strength of the entire overhead transmission line 70 as a result. Thus, at least 80% of the plurality of carbon nanotubes 11 is preferably oriented within an angle of 30° along the length direction of the conductor unit 71 or the central tension wire 73.

A conventional overhead transmission line is generally an ACSR (Aluminum Conductor Steel Reinforced) overhead transmission line including a central tension wire having a steel wire or a steel core and a conductor unit made of aluminum or aluminum alloy, but in the overhead transmission line 70 according to the fourth embodiment of the present invention, at least one of the central tension wire 73 and the conductor unit 71 is made of aluminum-carbon nanotube composite material. Accordingly, the overhead transmission line 70 has an increased transmission capacity and an improved tensile strength in comparison to conventional ACSR overhead transmission lines.

In detail, the overhead transmission line 70 according to the fourth embodiment of the present invention transmits electricity through not only the conductor unit 71 but also the central tension wire 73 and accordingly increases a transmission capacity of the entire overhead transmission line 70 by replacing a central tension wire of a conventional ACSR overhead transmission line, which is made of a steel core or a steel wire, with the central tension wire 73 made of aluminum-carbon nanotube composite material. In other words, the present invention advantageously increases the entire transmission capacity of the overhead transmission line 70 by using both of the conductor unit 71 and the central tension wire 73 as electricity transmission means.

In addition, by replacing a conductor unit of a conventional ACSR overhead transmission line, made of aluminum alloy material, with the conductor unit 71 made of aluminum-carbon nanotube composite material, the overhead transmission line 70 according to the fourth embodiment of the present invention may be coupled and fixed to a pylon by means of not only the central tension wire 73 but also the conductor unit 71, which may increase an entire supporting force.

Meanwhile, in a case where both of the conductor unit 71 and the central tension wire 73 are made of aluminum-carbon nanotube composite material to configure the overhead transmission line 70, the overhead transmission line 70 is supported by means of both of the conductor unit 71 and the central tension wire 73. Thus, a supporting force of the overhead transmission line 70 is increased, and an entire transmission capacity is increased since both of the conductor unit 71 and the central tension wire 73 take charge of transmitting electricity.

In addition, since the central tension wire 73 is made of aluminum-carbon nanotube composite material, which is lighter than a steel core or a steel wire, the overhead transmission line 70 according to the fourth embodiment of the present invention advantageously has a lighter weight than conventional ACSR overhead transmission lines.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

| Reference Symbols | |
|---|---|
| 10: | electrical transmission line |
| 11: | carbon nanotube |
| 12: | aluminum |
| 30: | electrical transmission line for electric trains |
| 40: | pantagraph |
| 50, 70: | overhead transmission line |
| 51, 71: | conductor unit |
| 73: | central tension wire |

What is claimed is:

1. An electrical transmission line for transmitting electricity,
wherein the electrical transmission line is made of a composite material in which aluminum and a plurality of carbon nanotubes are combined, and a weight ratio of the carbon nanotubes to the aluminum is 0.5 to 3 wt %,
wherein 80% or more of the plurality of carbon nanotubes are oriented at an angle within 30° along a length direction of the electrical transmission line.

2. The electrical transmission line according to claim 1, wherein the electrical transmission line is an electrical transmission line for electric trains.

3. An electrical transmission line in which a plurality of conductor units playing both roles of transmitting electricity and supporting a wire extend in a twisted pattern,
wherein the conductor units are made of a composite material in which aluminum and a plurality of carbon nanotubes are combined, and a weight ratio of the carbon nanotubes to the aluminum is 0.5 to 3 wt %,
wherein 80% or more of the plurality of carbon nanotubes are oriented at an angle within 30° along a length direction of the conductor units.

4. An electrical transmission line, which includes a central tension wire and a plurality of conductor units extending on an outer periphery of the central tension wire in a twisted pattern,
wherein at least one of the central tension wire and the conductor units is made of a composite material in which aluminum and a plurality of carbon nanotubes are combined, and a weight ratio of the carbon nanotubes to the aluminum is 0.5 to 3 wt %,
wherein 80% or more of the plurality of carbon nanotubes are oriented at an angle within 30° along a length direction of the central tension wire or the conductor units.

5. The electrical transmission line of claim 4, wherein both of the central tension wire and the conductor units are made of the composite material.

6. The electrical transmission line of claim 5, wherein the central tension wire has a diameter greater than a diameter of each conductor unit.

* * * * *